UNITED STATES PATENT OFFICE.

WILLIAM L. DAWSON, OF LYNCHBURG, VIRGINIA.

IMPROVEMENT IN SOAPS.

Specification forming part of Letters Patent No. 31,959, dated April 9, 1861.

*To all whom it may concern:*

Be it known that I, WILLIAM L. DAWSON, of Lynchburg, in the county of Campbell and State of Virginia, have invented a new and useful Improvement in Soaps; and I do hereby declare that the following is a full and exact description thereof.

My invention consists in a new and useful composition of matter or soap.

As a basis for making my new composition of matter, I take about seventy-five pounds of strong potash-lye, seventy-five pounds of tallow, twenty-five pounds of cocoanut-oil, and make the same into a compound by the common process of soap-making. Then, in order to make thirty pounds of my new composition or soap, take about two gallons of soft water and heat the same to the boiling-point in an iron kettle or other suitable vessel. To this water add sal-soda, one-half pound; refined borax, two ounces; spirits turpentine, two table-spoonfuls; linseed-oil, one tea-spoonful. Stir this mixture one or two minutes, or until the soda and borax are dissolved. Then add thereto, say, fifteen pounds of the compound made from lye, tallow, and cocoanut-oil, the same being previously cut into thin slices in order more readily to dissolve. Continue the heat, accompanied by stirring, for ten or fifteen minutes, until the compound is thoroughly dissolved. Then add two ounces of spirits of hartshorn, and again stir the whole about two minutes. This composition may now be scented or colored at pleasure and then poured off to cool, when it is ready for use. It may be made into toilet-cakes, in the usual manner. The proportions of the ingredients may be somewhat varied (and for washing-soap a smaller quantity of the first-mentioned compound may used—say about one-third the amount—the water remaining the same) without departing essentially from my invention.

In some cases pipe-clay may be a useful addition, though I do not claim the use of that ingredient.

My new composition is cheap, and yet very efficient as a soap. It is found especially useful for chapped hands.

My soap composition is entirely free from the disagreeable odor usually accompanying other soap compositions containing the same ingredients in part which are employed by me.

I do not broadly claim the use of any of the separate ingredients above mentioned; but What I do claim is—

The combination of ingredients forming the composition set forth, which I believe is a new and useful composition of matter.

In testimony whereof I have hereunto set my hand this 15th day of November, 1860.

WM. L. DAWSON.

Witnesses:
 DANIEL BREED,
 EDM. F. BROWN.